April 28, 1953      M. P. MATTHEW      2,636,678
CARRIAGE SHIFTING MECHANISM
Filed Aug. 21, 1950      6 Sheets-Sheet 1
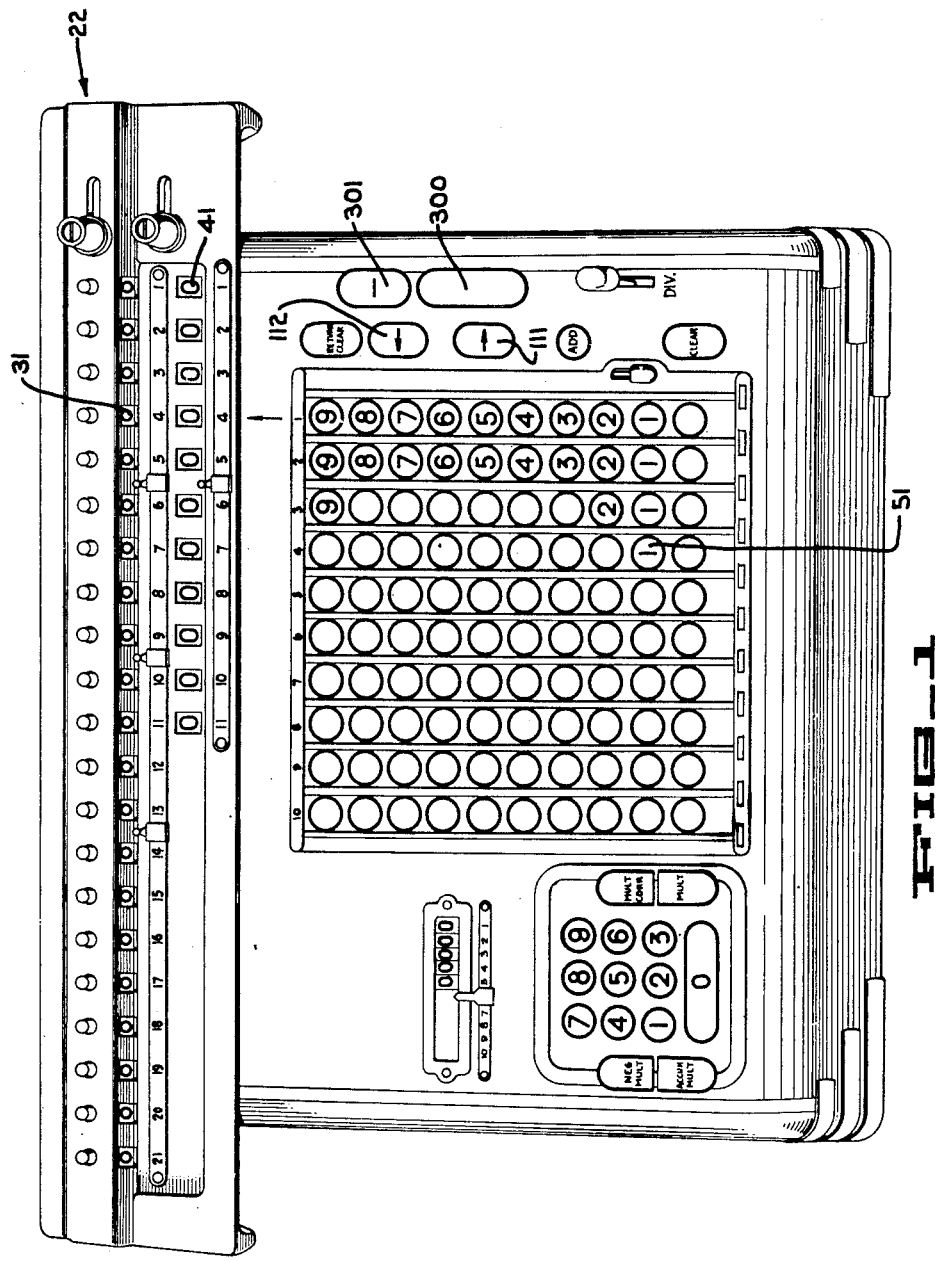
FIG_1
*INVENTOR.*
MORTON P. MATTHEW
BY

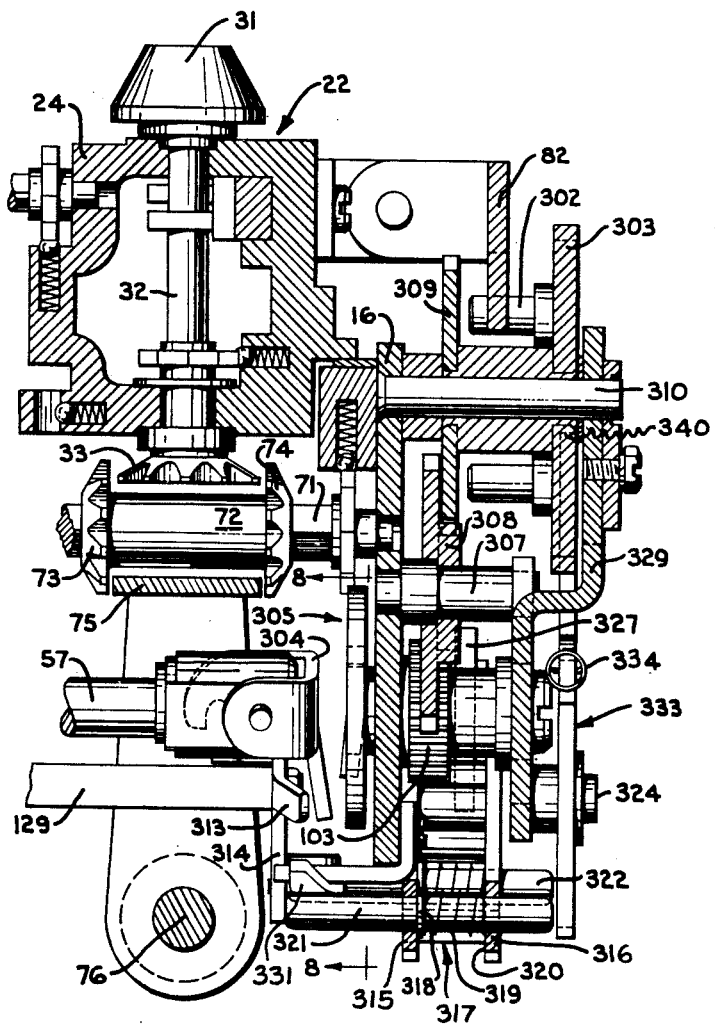
FIG_2

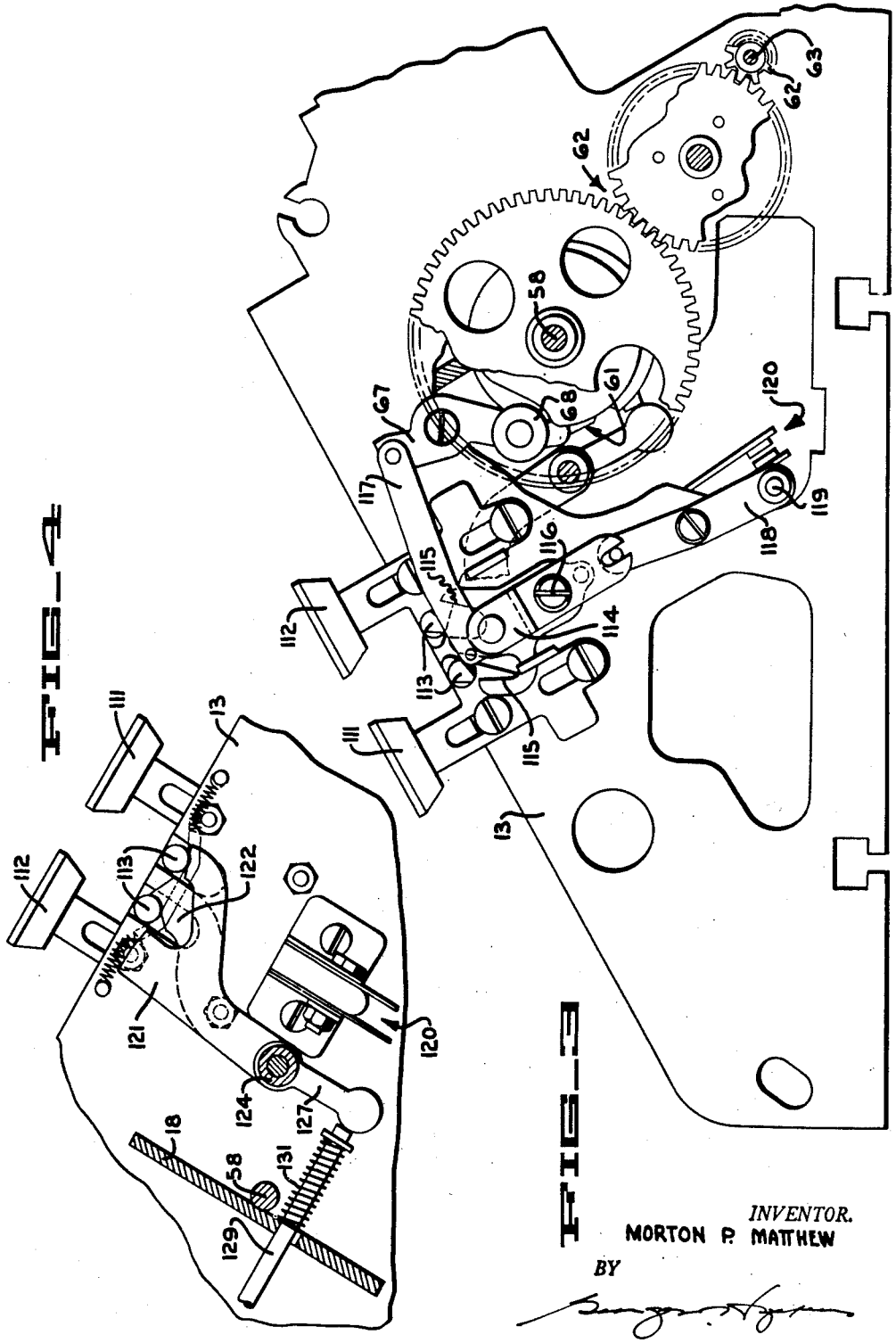

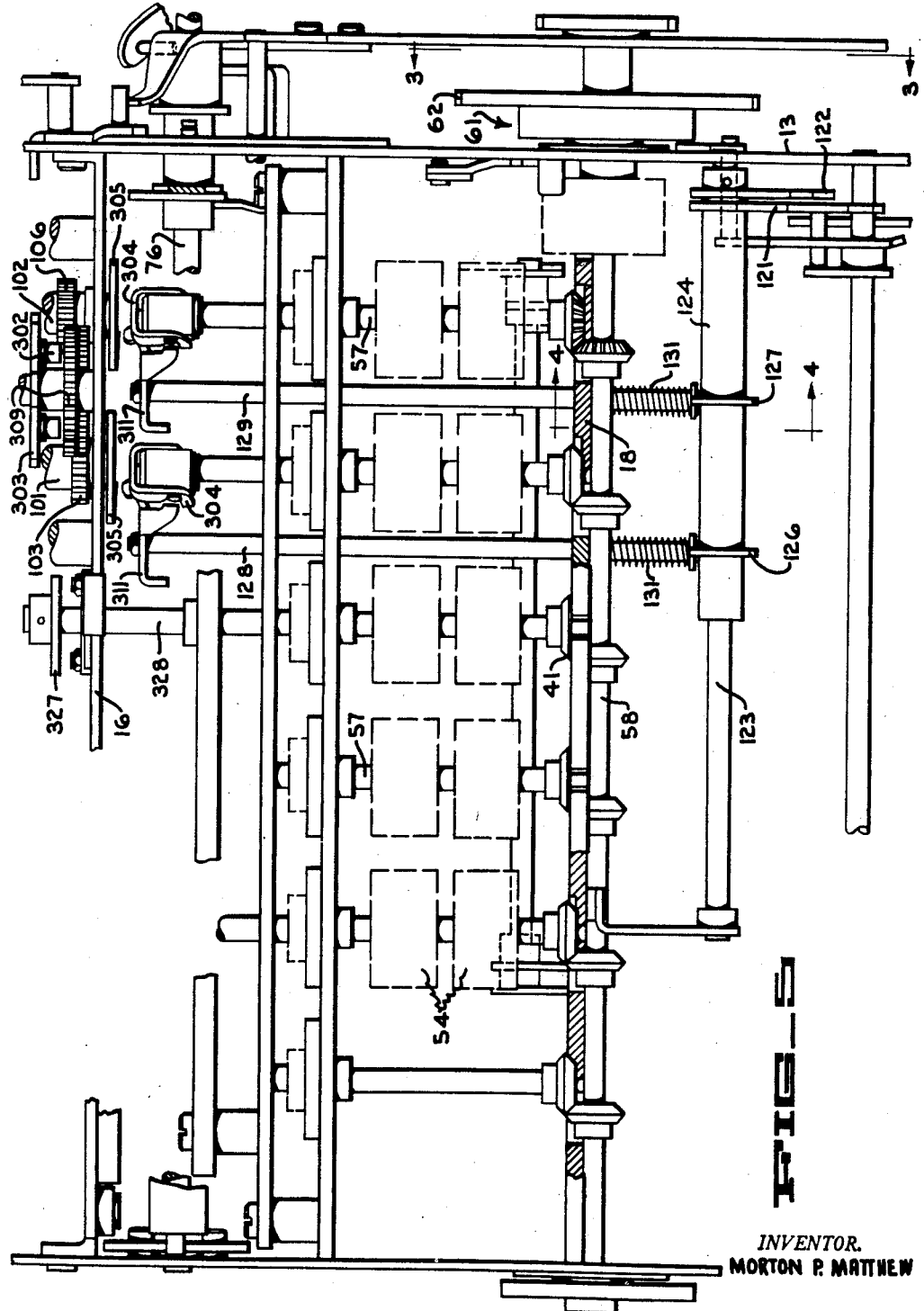

April 28, 1953     M. P. MATTHEW     2,636,678
CARRIAGE SHIFTING MECHANISM
Filed Aug. 21, 1950     6 Sheets-Sheet 5
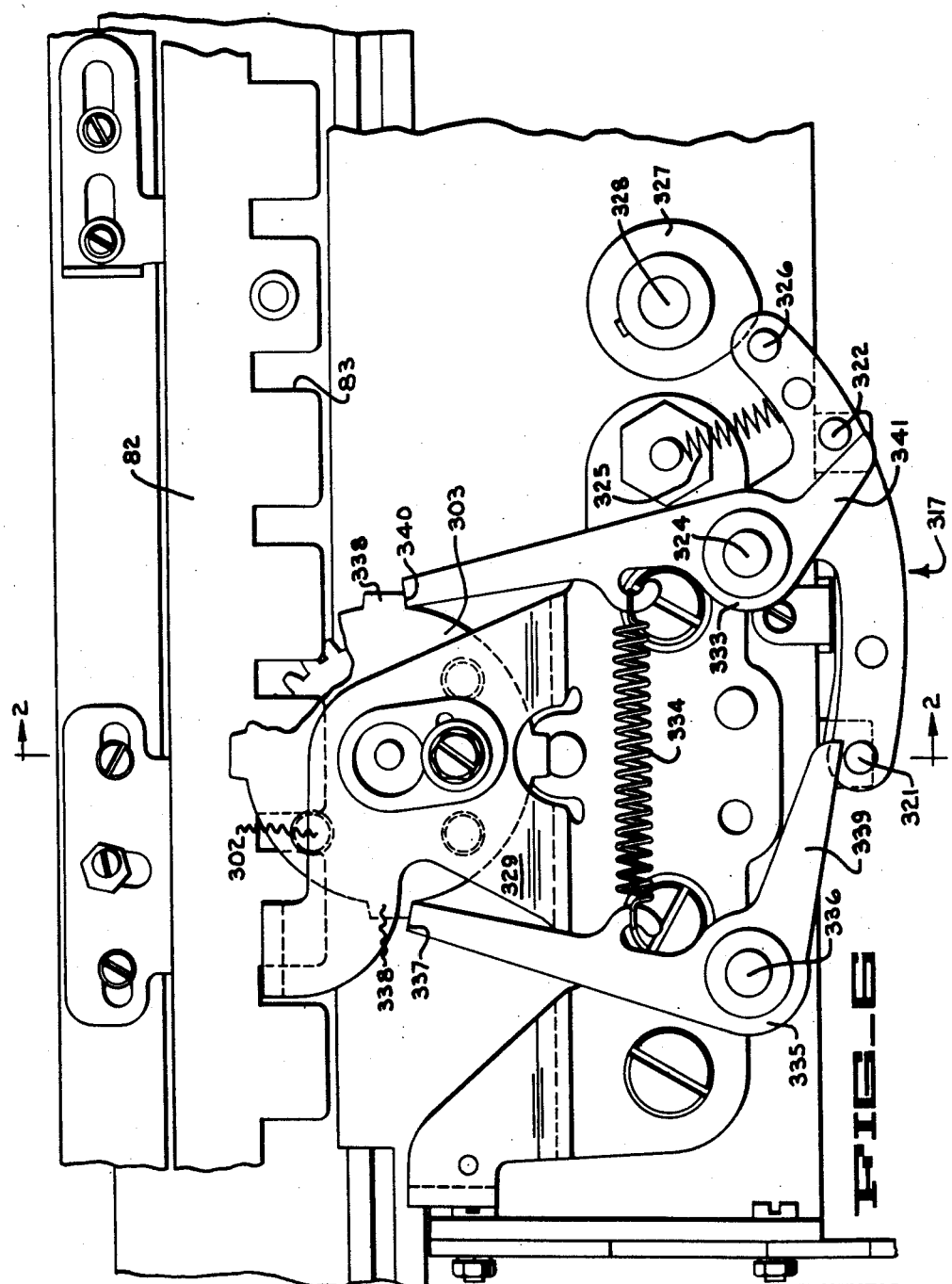
INVENTOR.
MORTON P. MATTHEW
BY

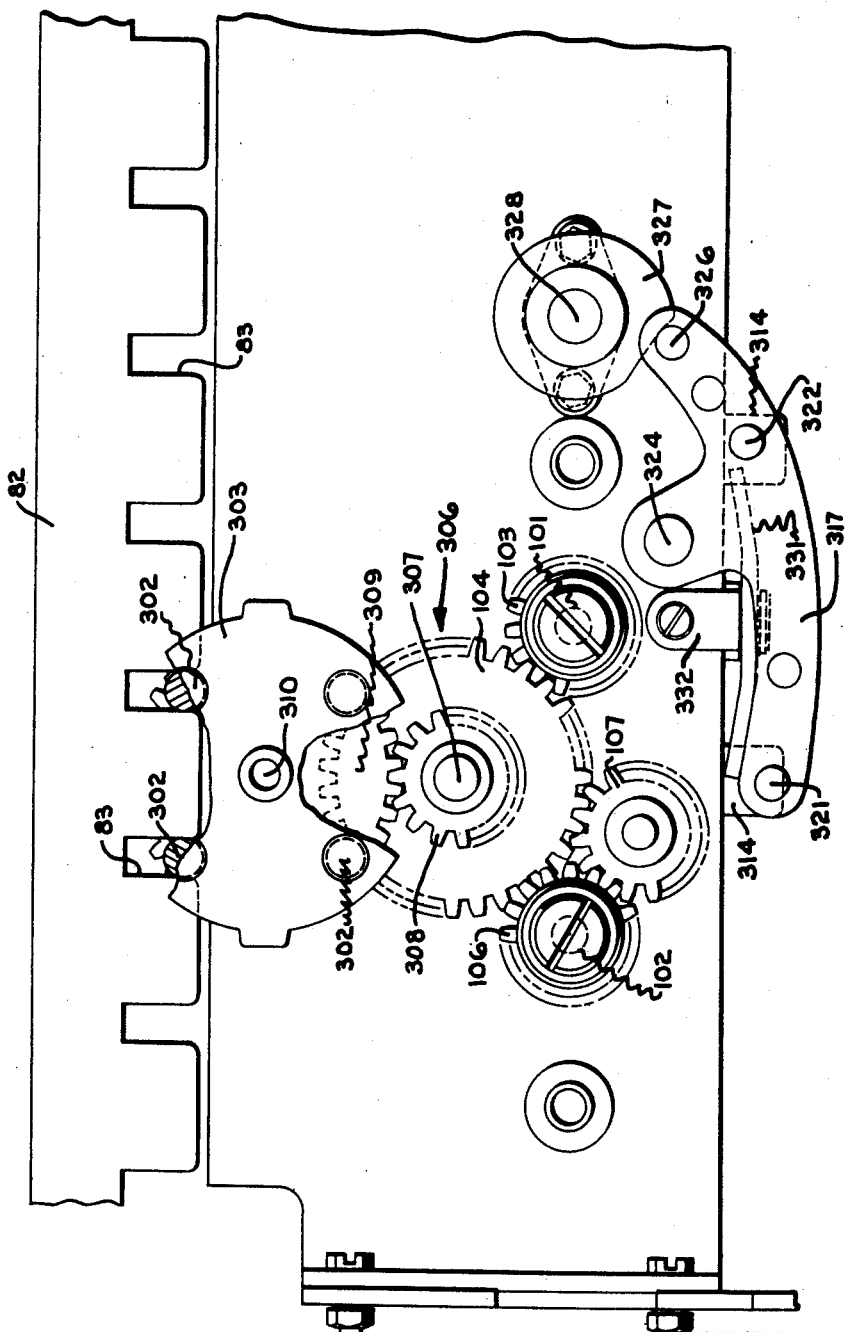

Patented Apr. 28, 1953

2,636,678

UNITED STATES PATENT OFFICE 2,636,678

CARRIAGE SHIFTING MECHANISM

Morton P. Matthew, Berkeley, Calif., assignor to Friden Calculating Machine Co., Inc., a corporation of California Application August 21, 1950, Serial No. 180,584

12 Claims. (Cl. 235—63)

This invention relates to calculating machines, and is more particularly concerned with the provision of improved mechanism for shifting the register carriage thereof selectively in either direction.

In the construction and operation of automatic calculating machines, various rack and pinion shifting mechanisms have been heretofore developed for ordinally shifting the register carriage in accordance with the requirements of the particular computation to be performed. Although some of these previously used shifting devices are relatively smooth in operation, they do not at the same time possess the simplicity of design and reliability which is required for commercial use. Most of the carriage shifting devices of the prior art also utilize yieldable spring-type stopping and arresting mechanisms which sometimes pull the carriage ahead of the shift driving means and therefore do not function in the manner of the instant invention to prevent overthrow of the carriage by positively locking the carriage in the correct position as soon as the desired ordinal shifting movement has been completed. The positive carriage shift centralizer mechanism of the instant invention not only effectively overcomes these operating difficulties, but is also more quiet in operation and reduces the load on the shift drive mechanism in such a manner as to substantially reduce the wear on the component parts thereof while at the same time facilitating manipulation of the carriage shift operation by means of a relatively light key touch control.

It is an important object of the present invention to provide for the register carriage of a calculating machine an ordinal shifting mechanism of simplified design which is also smooth and reliable in operation.

It is also an object of the invention to produce an improved mechanism for ordinally shifting the register carriage of a calculating machine selectively in either direction by a relatively smooth shifting movement, which mechanism is also relatively quiet in operation and not subject to objectionable vibration.

It is another object of the invention to provide a mechanism for positively stopping the lateral movement of the ordinally shiftable carriage of a calculating machine, which mechanism prevents overthrow of the shiftable carriage by positively locking the same in the correct position as soon as the desired ordinal shifting movement thereof has been completed.

It is a further object of the invention to provide a positive and nonyielding mechanism for stopping and holding the laterally shiftable carriage of a calculating machine in the desired ordinal position, which mechanism is substantially free from vibration and is also smooth and quiet in operation.

It is still another object of the invention to produce a positive mechanism of simplified design for stopping the ordinal shifting movement of a calculating machine carriage, which mechanism is operable to substantially reduce the wear on the component parts thereof while at the same time facilitating manipulation of the carriage shift operation by means of a control mechanism of the light key touch type.

Further objects are to provide a construction of maximum simplicity, economy, and ease of assembly and disassembly, also such further objects, advantages and capabilities as will fully appear and as are inherently possessed by the device and invention described herein.

The invention further resides in the combination, construction and arrangement of parts illustrated in the accompanying drawings, and while there is shown therein a preferred embodiment thereof, it is to be understood that the same is illustrative of the invention, and that the invention is capable of modification and change and comprehends other details of construction without departing from the spirit thereof or the scope of the appended claims.

Referring to the drawings:

Fig. 1 is a plan view of a standard Friden calculating machine showing the keyboard and control panel arrangement thereof.

Fig. 2 is a sectional view of the carriage shift mechanism taken along the lines 2—2 in Fig. 6, and looking in the direction of the arrows.

Fig. 3 is a right side view of the control plate taken along the lines 3—3 in Fig. 5, showing the switch and main clutch control mechanisms.

Fig. 4 is a detailed elevational view of the shift control mechanism taken along lines 4—4 in Fig. 5 and looking in the direction of the arrows.

Fig. 5 is a plan view of the machine with certain parts removed to more clearly show the construction and arrangement of the carriage shift control mechanism.

Fig. 6 is an enlarged rear view of the positive shift stopping mechanism.

Fig. 7 is similar to Fig. 6, but with certain parts removed to more clearly show details of the simplified and improved carriage shift mechanism.

General arrangement

The calculating machine selected for illustration in conjunction with the instant invention is of the general type described in the patent to Carl M. Friden No. 2,315,780 issued April 6, 1943, wherein similar parts are identified by the same reference numerals as in the present disclosure. The general arrangement and operation of such a standard Friden calculating machine is well known, and includes a shiftable register carriage 22, shown in Figs. 1 and 2, which serves to mount the numeral wheels of a revolutions counter 41 (Fig. 1), having a suitable actuating and tens-transfer means such as is described in Patent 2,229,889 issued to Carl M. Friden on January 28, 1941. This carriage 22 also mounts a plurality of ordinally arranged accumulator dials 31 provided with a tens-transfer mechanism of known design, which dials 31 are suitably journalled in carriage 22 and are adapted for actuation through suitable plus-minus gearing 73, 74 (Fig. 2) having a sliding driving engagement with a square shaft 71 in each order and a reversing engagement with a pinion gear 33 secured to the lower end of each of the accumulator dial shafts 32. As is fully shown and described in the aforementioned Friden Patent No. 2,315,780, a pair of value selecting gears are slidably supported for rotation with the square actuating shafts 71 in each order, which gears receive from their associated selection slides differential increments of movement which bear a predetermined relationship to the value of the keyboard amount key 51 (Fig. 1) which has been depressed in that order. Hence, the stepped teeth on the associated actuating cylinders 54 (Fig. 5) rotate the corresponding square shafts 71 to an extent dependent upon the values of the particular amount keys 51 which have been depressed. The sign character of registration for the accumulator register dials 31 is controlled by shifting the plus-minus gearing 73, 74 under control of a strap or gate 75 mounted by suitable upright arms on a transverse rockable shaft 76 (Figs. 2 and 5) which may be controlled by the respective plus and minus keys 300, 301 (Fig. 1), or in any other convenient manner in performing calculating operations.

As shown in Figs. 3 and 5, transverse drive shaft 58 and the associated unidirectional actuating shafts 57 are driven cyclically from a suitable electric motor through main clutch 61 (Figs. 3 and 5) which is driven by suitable gearing 62 from the motor output shaft 63. Clutch 61 is engaged or disengaged by the pivotal movement of a clutch control lever 67 (Fig. 3) which is pivotally mounted on the side plate of the machine. During rotation of this main clutch, clutch control lever 67 and the parts associated therewith are maintained in active position by a roller 68 carried by clutch control lever 67 and adapted for engagement with the periphery of the clutch in such a manner that the clutch control lever 67 can only move to clutch disengaging position whenever the machine is in the full cycle position, as is fully shown and described in Patent No. 2,229,889 issued to Carl M. Friden on January 28, 1941.

Carriage shifting mechanism

Means are provided for shifting the carriage in either direction from one ordinal position to another by power-driven means controlled by manually operable keys. For this purpose carriage 22 is provided with a rack 82 (Figs. 6 and 7) suitably mounted along the rear edge thereof, which rack 82 has a plurality of vertical slots 83 having a width slightly greater than the diameter of the coacting shift pins 302, which slots are formed in the lower edge of rack 82 and are spaced apart a distance equal to the ordinal spacing of the machine. These slots 83 are adapted for engagement by a coacting pair of the four shift pins 302 which are symmetrically disposed in quadrature arrangement on the carriage shift drive disk or pin wheel 303, carried by a hub journalled on a fixed shaft 310 mounted on frame bracket 16 and shift gear bearing plate 329 (Figs. 2 and 6) secured thereto, the wheel 303 being adapted to be rotated by means to be hereinafter described so as to effect a lateral shifting movement of the carriage. Thus, a one-fourth or 90° rotation of the drive disk or pin wheel 303 moves rack 82 laterally so as to effect one ordinal movement of the shiftable carriage 22. At its ends the shift rack 82 is provided with a pair of oppositely disposed yieldable pawls, not shown, which are adapted to be rocked by the shift pins 302 against an associated return spring so as to prevent the attempted shifting of the register carriage beyond the lowest and highest ordinal positions thereof, as is fully shown and described in Carl M. Friden Patent No. 2,294,083, issued August 25, 1942.

In order to rotate the carriage shift disk 303 in either direction by selectively operable drive connections from the actuating means of the machine, the lowest order actuating shafts 57 (Fig. 5) are extended rearwardly and have respective shift clutch drivers 304, preferably of the type shown and described in my copending application S. N. 182,682 filed September 1, 1950, which drivers are pivotally connected to the ends of the adjacent shafts 57 in such a manner as to form a readily controllable clutching and declutching engagement with the associated clutch follower assemblies 305 on the respective gear sleeves 101, 102. Gear sleeve 101 is provided with a gear 103 which meshes with a driven gear 104 of the shift gear assembly 306 (Fig. 7). Gear sleeve 102 has offset axially from gear 104 a gear 105 which meshes with a relatively wide reverse idler gear 107 suitably journalled on the frame and meshing with the gear 104. This gear 104 forms part of the unitary compound gear assembly 306 (Figs. 2 and 7) which also includes the short shaft 307 and a smaller concentric gear 308 adapted to engage with a shift drive gear 309 carried by a hub adapted to rotate about the fixed shaft 310, which hub carries at its other end the carriage shift disk 303. Thus, rotation of the gear sleeves 101 and 102 in a clockwise direction, as viewed in Fig. 7, causes shifting of the carriage 22 to the right and to the left, respectively, as viewed from the rear of the calculating machine.

Manually operable control means are provided to enable shifting the carriage in either direction through one or more ordinal spaces. Shift keys 111, 112 (Figs. 1, 3 and 4) are depressible to initiate shifting of the carriage to the right and left, respectively, as viewed from the front of the machine (to the left and right, respectively, in Fig. 7). Depression of either shift key 111, 112 serves to enable the associated drive connection, as well as to engage the clutch and energize the motor. Keys 111 and 112 are suitably mounted for endwise movement on the frame plate 13 and carry respective pins 113 associated with lever 114 (Fig. 3) pivoted at 116 on the frame plate 13. One part of lever 114 has inclined cam slots 115 arranged for cooperation with the respective pins 113. Lever 114 is connected by link 117 with the clutch control lever 67 (Fig. 3) so that the main clutch 61 is engaged upon depression of either shift key. At its lower end lever 114 (Fig. 3) is pivotally connected with lever 118 also suitably pivoted on the frame and carrying an insulated pin 119 operatively related to close the contacts of the motor switch 120 upon depression of either shift key.

To enable the respective drive connections from the actuating shafts 57 to the carriage shifting mechanism upon depression of the shift key, the respective pins 113 (Fig. 4) overlie levers 121 and 122 secured on sleeve 124 and its axial shaft 123. Shaft 123 and sleeve 124 carry similar depending arms 126 and 127, respectively (Figs. 4 and 5), having their lower ends disposed in front of the respective shift control rods 128 and 129, which rods have return springs 131 associated therewith to maintain them normally in inactive position. At their rearward ends, each of the rods 128 and 129 carries a controller 311 adapted to coact with the associated shift clutch driver 304 so that upon depression of either shift key 111, 112 the associated drive connection is established in the manner described in my copending application S. N. 182,682, supra, at the same time that the main clutch 61 is engaged and the motor is energized. Thus, by the selective depression of shift keys 111 and 112, carriage shift drive disk 303 can be rotated in either direction to effect ordinal shifting of the carriage.

*Mechanism for stopping and terminating shifting movement of the carriage in any desired ordinal position*

Positive arresting and stopping mechanism is provided for preventing overthrow of the carriage and for locking the same in the selected ordinal position after the desired shifting movement has been terminated by suitable means, as by releasing a depressed shift key 111 or 112 (Fig. 1). The mechanism now to be described does not rely upon springs to perform the mechanical work required for stopping the shifting movement of the carriage, thereby reducing the load on the shift drive mechanism and substantially eliminating any tendency of the carriage to pull ahead of the shift drive so that a smooth and relatively quiet carriage shifting action is achieved. It will be recalled that as the shift keys 111, 112 are selectively depressed the corresponding clutch driver 304 is engaged with its associated follower assembly 305 (Fig. 5) and the main clutch 61 and switch contacts 120 closed so that the carriage 22 is shifted laterally as desired. The shift control rods 128, 129 are provided at their rear ends with shift controllers 311, each having thereon a forwardly extending clutch disengaging dog, an angularly outwardly extending clutch engaging ear 313 (Fig. 2), and a downwardly disposed vertical shove dog 314. The shove dog 314 on the controller mounted on left shift rod 128 lies directly in front of a left shift control pin 322 and the shove dog on the controller mounted on right shift rod lies directly in front of a similar right shift pin 321 (Fig. 2). The shift control pins 321, 322 (Figs. 2, 6 and 7) are slidably mounted in, and project longitudinally beyond suitable holes formed in the spaced shift unlocking plates 315 and 316, which are rigidly secured together to form an integral lever or rocker 317. As shown in Fig. 2, each of these pins 321, 322 is provided with a centrally disposed annular stop ring 318 which is urged forwardly against plate 315, to its normally inactive position, by a coaxial compression spring 319, the other end of which bears against the inner surface 320 of plate 316. These springs 319 aid the shift rod return springs 131 (Figs. 4 and 5) and tend to retract the shift control pins 321, 322 (Fig. 2) so that the outer ends thereof are normally disposed out of the operative range of the shift locking levers 333, 335. In this normally retracted position of the shift control pins 321, 322, the inner ends thereof are pressed against the coacting shove dogs 314 on the adjacent controllers 311, so that the shift control rods 128, 129 are also moved forwardly to their normally inactive position as shown in Fig. 2. Shift unlocking plate 317, which carries with it the shift control pins 321, 322, is pivotally supported on a pin 324 suitably secured to the frame of the machine. This rocker plate 317 is urged in a counter-clockwise direction by a spring 325 (Fig. 6) and carries at its left end a cam follower pin 326 which coacts with a shift unlocking control cam 327 secured to a shaft extension 328 carried by the third order actuator shaft 57. As shown in Fig. 7, there is provided a shift interlock lever 331 pivotally supported on the frame bracket 332 and having opposing ends adapted to engage with the controller shove dogs 314 associated with the respective control pins 321, 322. Hence, lever 331 prevents the right and left shift clutch mechanisms from being engaged at the same time, and also functions as a limiting stop for the shift control rods 128, 129.

Referring now to Fig. 6, it will be seen that there is also pivotally supported on pin 324 a shift locking lever 333 which is connected by the tension spring 334 to an oppositely disposed shift locking lever 335 pivotally mounted as at 336 on the shift gear bearing plate 329. The lever 335 is provided with a substantially square cut shoulder 337 which is adapted to be urged by spring 334 into positive engagement with the left-hand ear 338 on the carriage shift drive disk 303 whenever the pin 321 is in its inactive position forward of the plane of the coacting inwardly disposed arm 339 on lever 335. Similarly, the shift locking lever 333 is provided with an oppositely disposed shoulder 340 which is adapted to be urged by spring 334 into positive engagement with the right-hand ear 338 (Fig. 6) on the shift drive disk or pin wheel 303 whenever the control pin 322 is in its inactive position forward of the plane of the coacting angularly disposed lower arm 341 which is provided on lever 333.

During left shift of the carriage 22 (to the right in Fig. 6), pin 322 is moved rearwardly by the controller 311 associated with left shift control rod 128 so as to form an operative connection between the shift unlocking rocker 317 and lever 333. As the shift cycle commences, pin 326 moves onto the high point of cam 327 (Fig. 6) so as to rock rocker 317 and lever 333 clockwise, so as to release shoulder 340 from engagement with the right-hand ear 338 on the associated shift drive disk or pin wheel 303. As the left shift operation progresses, the plate 303 rotates through an angle of 90° (clockwise in Fig. 6) and the lower ear thereon moves to the horizontal position, momentarily camming the lever 335 counter-clockwise against the tension of spring 334. As the plate reaches its 90° position the arm 335 snaps back behind the ear to form a detent against rebound of the shift plate 303. During the course of a single cycle shift, or prior to the termination of the last shift cycle in a multiple shift operation, the left shift key will be released. Thereupon shift rod 128 and its controller moves forwardly. Pin 322 follows its associated shift controller forwardly out of the range of arm 341 on lever 333, thereby enabling shoulder 340 to be urged by spring 334 back into active position for positive engagement with the right-hand ear on pin wheel disk 303 as it comes into the full-cycle position.

In a similar manner, a right shift of carriage 22 (to the left in Fig. 6) is effected by causing the control rod 129 and associated controller 311 to be moved rearwardly, as by a depression of the control key 111. Shifting of the associated controller 311 to cause engagement of the shift clutch mechanism extends pin 321 (Fig. 6) into operative engagement with arm 339 on lever 335. Thus, the initial clockwise rocking movement which is imparted by cam 327 to shift unlocking rocker 317, rocks bell crank 335 counter-clockwise to disengage shoulder 337 from the associated ear 338.

In this manner, the stop arm 333 or 335 against which the drive plate 303 is moving, is moved free and clear of the stopping ears 338 on disk 303, while the other finger is intermittently cammed out of engagement with the ears on pin wheel disk 303. The latter arm acts as a detent against rebound, while the former will be returned at the proper time to form a positive stop against forward motion of the plate at the end of a shift cycle. During the course of a single shift, or in the last step of a multiple shift operation the release of key 111, or 112 permits pin 321 or 322 to be retracted out of the operative range of arm 339 or 341. Spring 334 thereupon rocks the displaced lever into engagement with the rim of plate 303 so as to form a positive stop for the approaching ear 338. In this manner, the locking fingers 333, 335 coact with the respective ears 338 on pin wheel disk 303 to positively stop and retain the upper shift pins 332 (Fig. 6) carried by disk 303 in the proper position within the coacting vertical slots 83 on shift rack 32.

During single order shifting of the carriage 22, in response to a momentary depression of either of the shift control keys 111, 112 so as to cause quadrature clockwise or counter-clockwise angular displacement of disk 303, it will be apparent that the stop arm against which the ears 338 are moving is first released and then returned to its active position in time to establish a positive limiting engagement with the upper ear on pin wheel disk 303 (Fig. 6). Thus the pin wheel 303 is rotated exactly 90 degrees to shift carriage 22 one exact ordinal position and there stopped without possibility of overthrow or rebound. The clutch shown in my copending application above-mentioned lags behind the cam by about 15°. Thus the arm 333 or 335 will always be rocked out of engagement before the clutch starts pin wheel 303 to rotating or, in multicycle operation, before the pin wheel reaches its full-cycle position. During multiple order shifting of carriage 22, however, the leading stop arm or finger is intermittently moved out of the operative range of the ears 338 and back into contact with the rim of wheel 303 in each ordinal step, as in a single order shift. However, as the cam 327 leads the respective clutch by about 15° the cam 327 and rocker 317 are operative to again rock the arm 333 or 335 out of engagement with the wheel 303 as the latter approaches a full-cycle position. In this way the multiple order shifting of the carriage is smooth and quiet, for the stop (until the last shifting step) is removed before the plate 303 and ears 338 reach a full-cycle position.

The movement of the normally active stop arm out of the operative range of the coacting ears 338 on disk 303 is determined by the shape of shift interlock cam 327, the configuration of which may be readily modified to provide for the most effective stopping action of the carriage shifting mechanism under particular operating conditions. It will also be observed that spring 334 performs no centralizing work, but that this spring tends to enable active positive engagement of the stop arms or fingers 337, 340 with the associated ears 338 on pin wheel drive disk 303. Hence, spring 334 imposes substantially no additional load on the carriage shifting mechanism, thereby decreasing objectionable noise, reducing wear on the component parts of the shift stopping mechanism, and minimizing any tendency of the shiftable carriage 22 to pull ahead of the associated shift drive.

I claim:

1. In a calculating machine having a shiftable register carriage, a reversible gear carriage drive assembly, and driving means including a pair of normally open shift clutches adapted to be selectively closed to cause the said reversible gear assembly to shift the said carriage laterally in either direction, the combination which comprises a carriage stopping mechanism including a pair of oppositely disposed stop arms normally biased into limiting engagement with the said reversible gear assembly to positively arrest and hold the said shiftable carriage centrally in its selected position, a power-operated rockable member having a pair of positionable members thereon respectively associated with each of said stop arms, and means operated by the closing of a shift clutch for positioning the one of the said members associated with the respective stop arm, whereby the rocking of the rockable members will be operative to render the corresponding stop arm ineffective during a shifting movement of the said carriage.

2. In a calculating machine having a shiftable register carriage, a reversible gear carriage drive assembly, and driving means including a pair of normally open shift clutches adapted to be selectively closed to cause the said reversible gear assembly to shift the said carriage laterally in either direction, a carriage stopping mechanism which comprises the combination of a pair of oppositely disposed stop arms normally retained in limiting engagement with the said reversible gear assembly, a power-operated rockable member, a pair of positionable pins in said member each positionable to engage a respective stop arm and operative to move the same to a disengaged position on rocking of said rockable member, and means controlled by the respective shift clutches for positioning one or the other of said pins, thereby disabling the corresponding stop arm at the beginning of a shifting cycle of the said carriage.

3. In a calculating machine having a shiftable carriage, a reversible gear carriage drive assembly, and driving means including a pair of normally open shift clutches adapted to be selectively closed for causing the said reversible gear assembly to shift the said carriage laterally in either direction, the combination which comprises a carriage stopping mechanism including a pair of oppositely disposed stop arms normally retained in active engagement with the said reversible gear assembly to positively arrest and hold the said shiftable carriage centrally in its selected ordinal position, a power-operated rockable member having a pair of normally inactive positionable pins thereon, and means responsive to the movement of either of the said normally open shift clutches to its closed position for moving the associated pin to an extended active position in the plane of the associated stop arm, thereby enabling the said rockable member to move the corresponding stop arm out of active holding engagement with the said reversible shift gear assembly.

4. In a calculating machine having a shiftable carriage, a reversible gear carriage drive assembly, and driving means including a pair of normally open shift clutches adapted to be selectively closed for causing the said reversible gear assembly to shift the said carriage laterally in either direction, the combination which comprises a carriage stopping mechanism including a pair of oppositely disposed stop arms adapted to be normally positioned in active engagement with the said reversible gear assembly to positively stop and lock the said shiftable carriage centrally in its selected ordinal position, a power-operated rockable member having a pair of normally inactive axially slidable control pins thereon, and means responsive to the movement of either of the said normally open shift clutches to its closed position for moving the associated control pin to an extended active position within the plane of the associated stop arm, whereby the said power-operated rockable member is enabled to move the corresponding stop arm out of active engagement with the said reversible shift gear assembly.

5. In a calculating machine having a shiftable register carriage, a reversible gear carriage drive assembly, and driving means including a pair of normally open shift clutches adapted to be selectively closed to cause the said reversible gear assembly to shift the said carriage laterally in either direction, the combination of a carriage stopping mechanism for substantially eliminating overtravel movement of the said carriage during shifting thereof comprising a pair of oppositely disposed stop arms normally retained in operative engagement with the said reversible gear assembly to positively arrest and hold the said shiftable carriage centrally in its selected ordinal position, a rockable member operated by the main drive of the machine and having a pair of longitudinally movable and normally retracted shift control pins thereon, and means responsive to the movement of either of the said normally open shift clutches to its closed position for moving the associated shift control pin to an active position within the plane of the associated stop arm, whereby the said rockable member is enabled to move the corresponding stop arm out of operative engagement with the said reversible shift gear assembly as long as the associated shift clutch remains closed.

6. In a calculating machine having a shiftable register carriage, a reversible gear carriage drive assembly, and driving means including a pair of normally open shift clutches adapted to be selectively closed to cause the said reversible gear assembly to shift the said carriage laterally in either direction, the combination of a carriage stopping mechanism for substantially eliminating overtravel movement of the said carriage during the shifting thereof comprising a pair of oppositely disposed leading and trailing stop arms normally retained in positive stopping and locking engagement respectively with the said reversible gear assembly to positively arrest and hold the said shiftable carriage centrally in its selected ordinal position, a rockable member operated by the main drive of the machine and having a pair of normally retracted positionable control pins thereon, and means responsive to the movement of either of the said shift clutches for causing the corresponding control pin to be actively extended so as to enable the said rockable member to move the said leading stop arm out of engagement with the said reversible shift gear assembly as long as the associated shift clutch remains closed.

7. In a calculating machine having a shiftable register carriage, a reversible gear carriage drive assembly including a pin wheel gear, and driving means including a pair of normally open shift clutches adapted to be selectively closed for causing the said drive assembly to shift the said carriage laterally in either direction, the combination which comprises a plurality of equiangularly spaced stopping ears on the periphery of the said pin wheel gear, and a relatively quiet and smooth acting mechanism for stopping the said carriage while substantially preventing reverse movement during the carriage shifting operation comprising a pair of oppositely disposed leading and trailing fingers adapted to be moved into positive engagement with a diametrically opposed pair of the said stopping ears substantially at the time the said carriage reaches its preselected shifted position, a rockable member having a pair of normally retracted and longitudinally positionable shift control pins thereon, and means responsive to the movement of either of the said shift clutches to its closed position for moving the associated control pin to its active position, thereby enabling the said rockable member to move the said leading finger out of engagement with the said stopping ears on the said pin wheel gear as long as the associated shift clutch remains closed.

8. In a calculating machine having a shiftable register carriage, a reversible gear carriage drive assembly including a pin wheel gear, and driving means including a pair of normally open shift clutches adapted to be selectively closed for causing the said drive assembly to shift the said carriage laterally in either direction, the combination which comprises a plurality of equiangularly spaced stopping ears on the periphery of the said pin wheel gear, and a carriage stopping mechanism for substantially preventing reverse movement of the said carriage during the terminal shift cycle thereof comprising a pair of oppositely disposed finger stops adapted to be moved into positive engagement with a diametrically opposed pair of the said stopping ears substantially at the time the said carriage reaches its selected ordinal position, an oscillating arm operated by the said driving means, a pair of axially slidable and normally inactive shift control pins on the said oscillating arm, and means responsive to the movement of either of the said shift clutches to its closed position for moving the associated control pin to its extended active position, thereby enabling the said oscillating arm to move the coacting stop finger out of engagement with the said stopping ears on the said pin wheel gear as long as the associated shift clutch remains closed.

9. In a calculating machine having a shiftable register carriage, a reversible gear carriage drive assembly including a pin wheel gear, and driving means including a pair of normally open shift clutches adapted to be selectively closed for causing the said drive assembly to shift the said carriage laterally in either direction, the combination which comprises a plurality of equiangularly spaced stopping ears on the periphery of the said pin wheel gear, and a relatively quiet and smooth acting carriage stopping mechanism adapted to substantially prevent overthrow of the said shiftable carriage by locking the same in its selected ordinal position as soon as the desired ordinal shifting movement thereof has been completed, which stopping mechanism includes a pair of oppositely disposed leading and trailing stop arms normally positioned for positive stopping and locking engagement with the said ears but adapted to be intermittently moved beyond the operative range thereof, an oscillating arm adapted to be cyclically operated by the said driving means, a pair of longitudinally positionable and normally inactive shift control pins on the said oscillating arm, and means responsive to the clutch-engaging movement of the said shift clutches for extending and projecting the corresponding control pin into the plane of the associated leading stop arm so as to establish an operative engagement therewith as long as the associated shift clutch remains closed.

10. In a calculating machine having a shiftable register carriage, a reversible gear carriage drive assembly including a pin wheel gear, and driving means including a pair of normally open shift clutches adapted to be selectively closed for causing the said drive assembly to shift the said carriage laterally in either direction, the combination which comprises a plurality of equiangularly spaced stopping ears disposed about the periphery of the said pin wheel gear, and a relatively quiet and smooth acting carriage stopping mechanism adapted to substantially prevent reverse movement of the said carriage during termination of the shifting movement thereof, which stopping mechanism includes a pair of oppositely disposed leading and trailing stopping fingers adapted to be moved into positive engagement with a diametrically opposed pair of the said stopping ears substantially at the time the said carriage reaches its selected ordinal position, an oscillating arm operated by the said driving means, a pair of longitudinally positionable and normally retracted shift control pins on the said oscillating arm, and a control member operated by the movement of a predetermined one of the said shift clutches to its closed position for moving the corresponding shift control pin to its active and extended position, thereby enabling the said oscillating arm to intermittently move the said coacting leading stopping finger out of the operative range of the stopping ears on the said pin wheel as long as the associated shift clutch remains closed.

11. In a calculating machine having a shiftable register carriage, a reversible gear carriage drive assembly, and driving means including shift clutch means operable to shift said carriage in a selected direction, a carriage centralizing mechanism which comprises the combination of a rockable stop arm, resilient means urging said arm into engagement with the said reversible gear assembly, engaging means on said gear assembly for engaging said stop arm, a power-operated rockable member, positionable means on said member movable to an operative position to engage said stop arm upon rocking of said member, and means operated by said shift clutch means to position said positionable means before the shift clutch means operates to move the carriage.

12. In a calculating machine having a shiftable register carriage, a reversible gear carriage drive assembly and driving means including shift clutch means selectively operable to rotate the drive assembly in either direction, and a pair of shift clutch control members respectively operable to determine operation of said clutch means to operate said drive assembly in the selected direction, a carriage centralizing mechanism which comprises a plurality of stop members carried by said drive assembly, a pair of stop arms resiliently urged into the path of rotation of said stop members, a power operated member, a pair of positionable interponents mounted on said power operated member and respectively positioned by the associated shift clutch control member to operatively connect said power operated member to the associated stop arm and thereby rock such stop arm out of the path of its associated stop member prior to the engagement of the clutch means and to release said arm after the beginning of rotation of said drive assembly.

MORTON P. MATTHEW.

References Cited in the file of this patent

UNITED STATES PATENTS

| Number | Name | Date |
|---|---|---|
| 2,063,899 | Anneren et al. | Jan. 26, 1937 |
| 2,313,817 | Friden | Mar. 16, 1943 |
| 2,380,642 | Friden | July 31, 1945 |
| 2,431,930 | Grip | Dec. 2, 1947 |